No. 706,085. Patented Aug. 5, 1902.
M. MOSKOWITZ.
ELECTRICAL SYSTEM FOR LIGHTING AND POWER.
(Application filed Sept. 28, 1901.)
(No Model.)
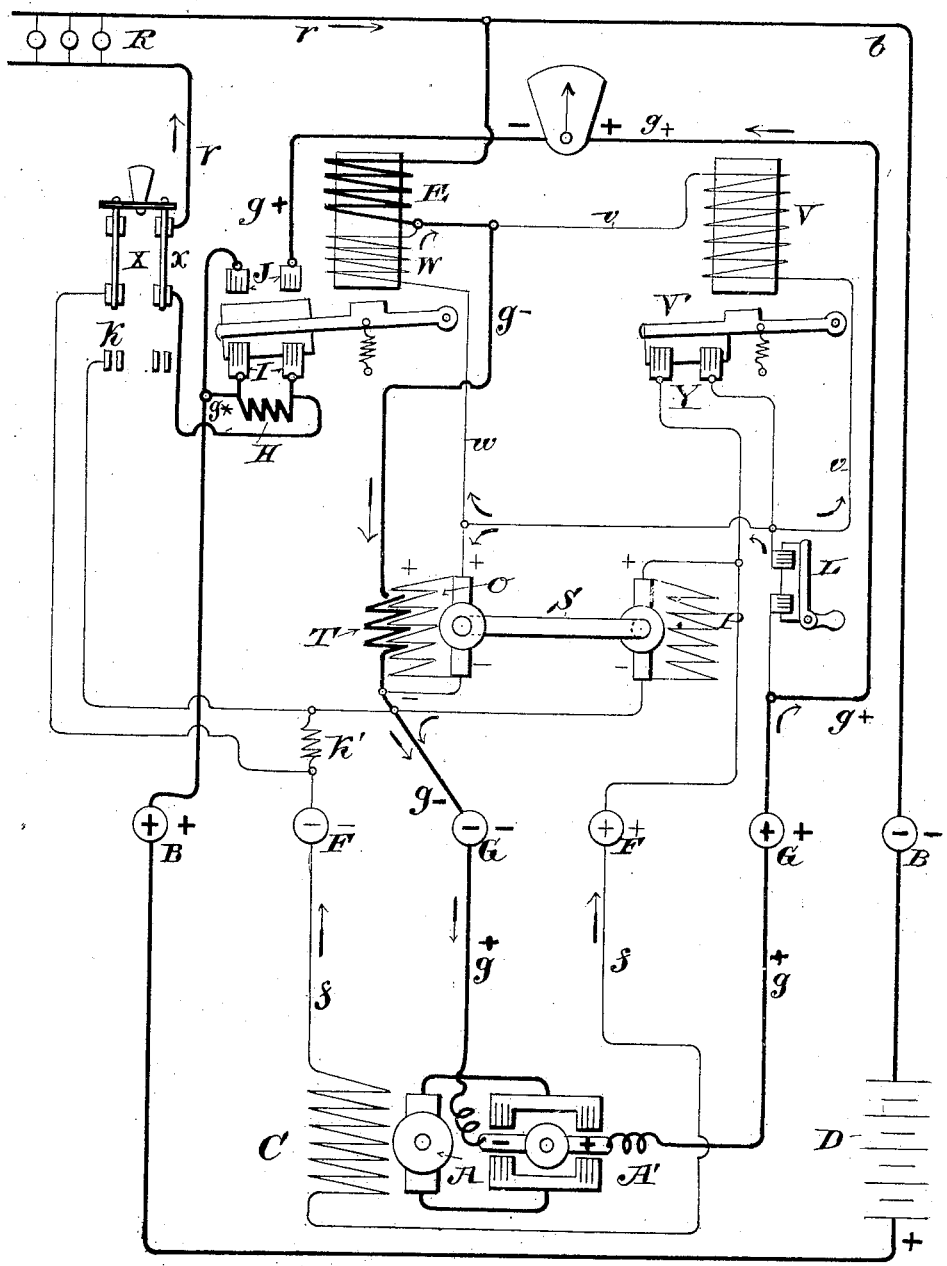
WITNESSES
INVENTOR
Morris Moskowitz
BY his ATTORNEY

UNITED STATES PATENT OFFICE.

MORRIS MOSKOWITZ, OF BROOKLYN, NEW YORK, ASSIGNOR TO JAMES H. YOUNG, TRUSTEE, OF NEW YORK, N. Y.

ELECTRICAL SYSTEM FOR LIGHTING AND POWER.

SPECIFICATION forming part of Letters Patent No. 706,085, dated August 5, 1902.

Application filed September 28, 1901. Serial No. 76,844. (No model.)

*To all whom it may concern:*

Be it known that I, MORRIS MOSKOWITZ, a resident of the borough of Brooklyn, in the city and State of New York, have invented certain new and useful Improvements in Electrical Systems for Lighting and Power, of which the following is a specification accompanied by drawings.

The invention is designed particularly for electric light and power systems for railway-cars and other uses in which an electric generator is driven from a source of power which varies in speed—as, for example, a car-axle—and in which a storage battery is employed to supply the current when the generator is disconnected. The system may be most conveniently illustrated and explained by a diagram of the preferred arrangement of electrical connections as employed for lighting a car by means of a battery and a generator the speed of which varies. In United States Letters Patent granted to me October 8, 1901, No. 684,083, I have set forth one system. The present invention is in some respects an improvement upon that system and in other respects a departure therefrom.

The present invention contemplates the use of a motor-dynamo, the motor portion of which is preferably driven from the main generator and the dynamo portion of which excites the field-magnet of the generator when the proper conditions have been obtained. The principal object attained by this arrangement is a better regulation and the fact that the motor-dynamo is started gradually as the current develops in the main generator, and, furthermore, there is no drain upon the storage battery in supplying the motor-dynamo, because the generator alone supplies it with current.

In the accompanying diagram the field-coil of the generator or main generator is indicated at C, its armature by A, and a pole-changer, manual or automatic, for changing the connections of the dynamo when its direction of rotation is reversed is indicated at A'. The positive and negative binding-posts of the generator are marked $G^+$ and $G^-$. The field-coil binding-posts are marked $F^+$ and $F^-$. The binding-posts of the storage battery D are marked $B^+$ and $B^-$. The shaft of the motor-dynamo is indicated at S, the motor field-coil and armature at O, and the generator field-coil and armature at P. A double switch X is connected to substantially simultaneously open the work-circuit R $r$ at X and short-circuit the resistance-coil K' at $k$, or vice versa. By "work-circuit" I mean the portion of the circuit or system including the lamps or other devices to be supplied with electric energy.

At I is a circuit-maker for short-circuiting a resistance-coil H when the battery is supplying the work-circuit and for introducing the resistance H into the circuit when the generator is supplying the work-circuit and charging the battery, the coil then serving to compensate for the slightly-increased voltage at the terminals of the work-circuit.

At J J are switch-contacts for connecting and disconnecting the generator from the system. When the circuit is open at J, it should be closed at I, and vice versa. Consequently a single electrically-controlled switch-arm provided with two controlling-coils W and E, which will be presently described, may be employed. In the position shown the battery may be supposed to be supplying the lamps of the work-circuit R, the current passing from $B^+$ through the short circuit at I, through switch X, conductors $r$, and directly back to the other battery-terminal $B^-$. When the dynamo is thrown into circuit at J, the current passes from the armature of the dynamo and binding-post $G^+$ through the conductor $g^+$, the ammeter, switch J, and dividing at $g^*$. Part of the current passes directly to charge the battery, while part of it passes through the compensating coil H and switch X to the work-circuit R. The returning currents from the battery and from the work-circuit pass through the conductor $g^-$, which includes the series coils E and T, which will be described, back to the negative binding-post $G^-$ of the generator.

At starting the generator is self-exciting, its field-coil C being connected with the armature-circuit by the switches L, switch Y, conductors $f$, coil K' or its short-circuiting switch $k$, and conductor $g^-$. The switch Y is opened automatically when the generator reaches a speed that produces somewhat less than the normal working voltage. The switch-arm V' of the switch Y is actuated by an electromagnet or other electrodynamic device, the coils V of which are connected to the respective conductors $g^+$ and $g^-$ of the generator-armature. Consequently as the electromotive force of the generator builds up the current in the coil V increases until at the proper time the switch Y is opened. Before this time is reached, however, the motor-dynamo, which is connected to excite the field-coils of the generator, develops electromotive force sufficient to maintain the proper current in the field-coils. The motor field and armature O of the motor-dynamo is connected, as shown, across the conductors $g^+$ and $g^-$ of the generator, so as to be driven by current derived from the generator. The field and armature P of the dynamo portion of the motor-generator are connected from one terminal to the binding-post $F^+$ and from the other terminal through the coil K' to the binding-post $F^-$. As soon as the necessary minimum speed and normal working voltage have been reached at the generator the generator-circuit is closed at the switch-contacts J by the drawing up of the switch-arm under the influence of the coil W, which derives current from the armature of the generator, whereupon the generator supplies current to the lamps and also charges the battery, as already described. Simultaneously with the closing of the circuit at J the short circuit around the compensating coil H is opened at the contacts I, thereby introducing the compensating coil H between the generator and the lamp-circuit R and compensating for the slight excess of voltage existing when the generator is charging the storage battery. The main current from the generator-armature passes through the magnet-coil E and the motor-field-regulating coil T already mentioned. The coil E is wound to act with and not against the coil W when the generator is supplying the work-circuit and charging the battery; but when the voltage of the generator falls even slightly below that of the battery a relatively large current is of course discharged from the battery in the reverse direction through the coils E and T and the armature of the generator. Such reverse current in the coil E opposes that in the coil W and neutralizes the magnetism, thereby allowing the switch-arm to drop and opening the generator-circuit at J, disconnecting the generator. At the same time the compensating coil H is of course short-circuited at I.

The regulation of the motor-dynamo, and thereby the regulation of the main generator, is accomplished by the series field-coil T of of the motor. If, for example, the generator produces the desired electromotive force and is automatically cut into the circuit when the car is running fifteen miles an hour, it follows that when the car is running at greater speed—for example, as high as sixty miles an hour—a large range of regulation is requisite to maintain the voltage of the generator constant. The regulating-coil T on the field of the motor O acts to strengthen the field of the motor when the current is flowing in the normal direction in the coil T. The coils being designed and proportioned so that the conditions are correct when the generator is included in the circuit and the car is running at fifteen miles an hour, it follows that upon an increase in speed and consequent tendency to increase the voltage of the generator a great increase in charging-current supplied from the generator to the battery will occur. This increase of current passing through the coil T strengthens the field magnetism of the mortor portion of the motor-dynamo, and consequently decreases the speed of the motor-dynamo. A decrease in the speed of the motor-dynamo, especially if the dynamo P is shunt-wound, as shown, reduces considerably the electromotive force of the dynamo, and consequently reduces the excitation or field magnetism of the generator, and thereby reduces the electromotive force of the generator. This action renders the system self-regulating, and a large increase in the speed of the generator merely causes a slight increase in the current that charges the battery without materially increasing the voltage on the lamp-circuit.

When the work-circuit or lamp-circuit is disconnected, there is not the same necessity for preventing the voltage of the generator from rising above that necessary to overcome the electromotive force of the battery. Consequently in order to effect a more rapid charging of the battery under such conditions the resistance-coil K' is removed from the field-circuit of the generator. When the switch X is opened and closed at $k$, it short-circuits the coil K, and consequently increases the excitation of the field-magnet of the generator, correspondingly increasing the voltage and charging the battery with greater rapidity.

From the foregoing the operation of the system is probably clear. In gradually increasing the speed of a car from starting to, say, sixty miles an hour the operation is as follows: The generator being self-exciting gradually builds up its electromotive force as the car starts, the current passing from the positive binding-post $G^+$ through the switch L and switch Y and thence through the field-coil C of the generator and by way of resistance K back to the binding-post $G^-$. Current also passes from the binding-post $G^+$ and switch L through the field and armature coil O of the motor-dynamo and back to the binding-post $G^-$, starting the motor-dynamo and gradually building up electromotive force in the dynamo portion P. As soon as a speed somewhat less than the minimum working speed—say ten miles an hour—is attained the magnet-coil V causes the raising of the switch-arm V' and the breaking of the exciting-circuit at Y; but by the time this occurs the dynamo P of the motor-dynamo is able to properly excite the field-coil C of the generator, and the generator becomes a separately-excited generator. When the voltage of the generator becomes sufficient, the current in coil W causes the closing of the generator-circuit at J and establishes the normal working conditions. The automatic regulation of the field of the generator maintains the voltage substantially constant over a wide range of speed; but whenever the speed slackens and the voltage of the generator falls below that of the battery the reversal in the current of the coil E breaks the circuit at J and cuts out the generator. A further lessening of the speed allows the self-exciting circuit to be again closed at Y, rendering the generator self-exciting, which condition is maintained until the speed of the generator again exceeds that necessary to raise the switch-arm V'.

Having now described the invention in its most approved form, I claim as the characteristic features thereof the following:

1. As an improvement in an electrical system having a work-circuit, a storage battery with connections for supplying the work-circuit, a generator subject to variations in speed, and connections therefrom for supplying the work-circuit and for charging the battery, the combination therewith of a motor-dynamo connected to derive its motor-current from the generator and having connections for exciting the field-coils of the generator, and having a regulating motor field-coil connected to strengthen the motor-field when the current from the main generator increases.

2. As an improvement in an electrical system having a work-circuit, a storage battery with connections for supplying the work-circuit, a generator subject to variations in speed, and connections therefrom for supplying the work-circuit and for charging the battery, the combination therewith of a motor-dynamo connected to derive its armature-current from the generator and having connections for exciting the field-coils of the generator, and having means for changing its working speed oppositely to the changes of speed of the generator.

3. As an improvement in an electrical system having a work-circuit, a storage battery with connections for supplying the work-circuit, a generator subject to variations in speed, and connections therefrom for supplying the work-circuit and for charging the battery, the combination therewith of a motor-dynamo connected to derive its motor-current from the generator and having connections for exciting the field-coils of the generator, means for regulating the strength of field of the generator, a circuit maker and breaker for the connection from the generator for supplying the work-circuit and battery, and automatic means for closing said circuit-maker when the desired electromotive force of the generator is attained.

4. As an improvement in an electrical system having a work-circuit, a storage battery with connections for supplying the work-circuit, a generator subject to variations in speed, and connections therefrom for supplying the work-circuit and for charging the battery, the combination therewith of a motor-dynamo connected to derive its motor-current from the generator and having connections for exciting the field-coils of the generator, means for regulating the strength of field of the generator, a circuit maker and breaker for the connection from the generator for supplying the work-circuit and battery, and automatic means for closing said circuit-maker when the desired electromotive force of the generator is attained, and means coactuated therewith for introducing a compensating resistance into the work-circuit.

5. As an improvement in an electrical system having a work-circuit, a storage battery having connections for supplying the work-circuit, a generator subject to variations in speed, and connections therefrom for supplying the work-circuit and for charging the battery, the combination therewith of self-exciting connections for the generator, automatic means for breaking the last of said connections when a predetermined speed is exceeded, means for separately exciting the generator, and means for regulating such excitation as the speed varies.

6. As an improvement in an electrical system having a work-circuit, a storage battery having connections for supplying the work-circuit, a generator subject to variations in speed, and connections therefrom for supplying the work-circuit and for charging the battery, the combination therewith of self-exciting connections for the generator, automatic means for breaking the last said connections when a predetermined speed is exceeded, means for separately exciting the generator, and means for closing the said connections for supplying the work-circuit and charging the battery, when a certain speed has been reached.

7. As an improvement in an electrical system having a work-circuit, a storage battery having connections for supplying the work-circuit, a generator subject to variations in speed, and connections therefrom for supplying the work-circuit and for charging the battery, the combination therewith of self-exciting connections for the generator, automatic means for breaking the last said connections when a predetermined speed is exceeded, a suitably-energized motor-dynamo connected to excite the field of the generator, and means for regulating the excitation as the speed of the generator varies.

8. As an improvement in an electrical system having a work-circuit, a storage battery having connections for supplying the work-circuit, a generator subject to variations in speed, and connections therefrom for supplying the work-circuit and for charging the battery, the combination therewith of self-exciting connections for the generator, automatic means for breaking the last said connections when a predetermined speed is exceeded, a suitably-energized motor-dynamo connected to excite the field of the generator, and provided with a motor field-coil connected to strengthen the motor-field as the speed of the main generator increases.

9. As an improvement in an electrical system having a work-circuit, a storage battery having connections for supplying the work-circuit, a generator subject to variations in speed, and connections therefrom for supplying the work-circuit and for charging the battery, the combination therewith of self-exciting connections for the generator, automatic means for breaking the last said connections when a predetermined speed is exceeded, a suitably-energized motor-dynamo connected to excite the field of the generator, and provided with means for changing its working speed oppositely to changes in the speed of the generator.

10. As an improvement in an electrical system having a work-circuit, a storage battery having connections for supplying the work-circuit, a generator subject to variations in speed, and connections therefrom for supplying the work-circuit and for charging the battery, the combination therewith of regulating means for controlling the electromotive force of the generator, a resistance normally included in the generator field-circuit, means for making and breaking the work-circuit, and means for cutting out or short-circuiting the said resistance when the work-circuit is open to increase the electromotive force for charging the battery in excess of that normally required on the work-circuit.

Signed this 27th day of September, 1901, at New York, N. Y.

MORRIS MOSKOWITZ.

Witnesses:
E. VAN ZANDT,
U. S. MORTON.